(12) United States Patent
Yoskowitz

(10) Patent No.: US 10,488,074 B2
(45) Date of Patent: Nov. 26, 2019

(54) AIRTIGHT BUSHING FOR DUCTWORK DAMPER AND THE LIKE AND DUCTWORK DAMPER UNIT INCORPORATING SAME

(75) Inventor: David Yoskowitz, Bloomsbury, NJ (US)

(73) Assignee: Capital Hardware Supply, Inc., Closter, NJ (US)

(*) Notice: Subject to any disclaimer, the term of this patent is extended or adjusted under 35 U.S.C. 154(b) by 764 days.

(21) Appl. No.: 13/481,336

(22) Filed: May 25, 2012

(65) Prior Publication Data

US 2013/0065505 A1    Mar. 14, 2013

Related U.S. Application Data

(60) Provisional application No. 61/573,679, filed on Sep. 9, 2011.

(51) Int. Cl.
*F24F 7/00* (2006.01)
*F24F 13/14* (2006.01)

(52) U.S. Cl.
CPC ........... *F24F 13/1406* (2013.01); *Y10T 16/05* (2015.01)

(58) Field of Classification Search
CPC .............................. F24F 13/14; F24F 13/1406
USPC ....................................................... 454/317
See application file for complete search history.

(56) References Cited

U.S. PATENT DOCUMENTS 2,225,472 A    12/1940  Franklin
2,656,137 A *  10/1953  Leggett ............... B60K 5/1291
                                                248/556
2,728,593 A *  12/1955  Hutton .................. F16C 27/063
                                                403/224

(Continued)

FOREIGN PATENT DOCUMENTS

EP    0810 408 A2    12/1997
GB    1 550 836       8/1979

(Continued)

OTHER PUBLICATIONS

International Search Report and Written Opinion dated Nov. 27, 2012 by the European Patent Office (ISA) in counterpart application No. PCT/US2012/054069.

(Continued)

*Primary Examiner* — Vivek K Shirsat
(74) *Attorney, Agent, or Firm* — Abelman, Frayne & Schwab

(57) ABSTRACT

A bushing is disclosed for pivotally mounting a damper in ductwork of the type generally used with heating, ventilation, and air conditioning (HVAC) systems. The bushing is a circular shaped member of silicone rubber material, which is particularly configured and dimensioned to provide an airtight fit with the ductwork to prevent loss of conditioned air at the pivot location, without compromising the rotational capability of the damper to alter the direction of the conditioned air. The bushing is dimensioned to be inserted into the ductwork and includes a peripheral groove which receives the ductwork in a manner which compresses the inner surface of the groove to provide the airtight seal. The bushing also includes a longitudinally tapered square central opening, which opening is dimensioned to engageably receive the damper pivot rod snugly to provide additional sealing at the interface between the bushing and the pivot rod.

12 Claims, 7 Drawing Sheets

(56) References Cited

U.S. PATENT DOCUMENTS

| | | | |
|---|---|---|---|
| 2,966,169 A | 12/1960 | Reece | |
| 3,009,746 A * | 11/1961 | Haushalter | F16F 1/38 |
| | | | 267/270 |
| 3,654,382 A | 4/1972 | Rubright | |
| 3,788,655 A | 1/1974 | Hathaway | |
| 3,861,828 A * | 1/1975 | Biermann | B64C 11/008 |
| | | | 416/145 |
| 4,767,108 A * | 8/1988 | Tanaka | B60G 7/00 |
| | | | 267/140.12 |
| 4,913,562 A | 4/1990 | Rosen | |
| 5,105,557 A * | 4/1992 | Vadasz et al. | 34/401 |
| 5,259,487 A * | 11/1993 | Petek | 188/267.1 |
| 5,370,360 A | 12/1994 | Buckley | |
| 5,455,986 A | 10/1995 | Gentile | |
| 5,518,446 A * | 5/1996 | Jacob | B08B 15/023 |
| | | | 137/486 |
| 5,921,277 A * | 7/1999 | Bernal | 137/556.3 |
| 5,950,381 A | 9/1999 | Stansbie | |
| 5,979,053 A | 11/1999 | Schaeffer et al. | |
| 6,051,795 A | 4/2000 | Fisher et al. | |
| 6,273,406 B1 * | 8/2001 | Miyamoto | B60G 3/202 |
| | | | 267/140.12 |
| 6,726,366 B2 * | 4/2004 | Grimke | 384/129 |
| 6,761,348 B2 | 7/2004 | Michels et al. | |
| 7,770,258 B2 | 8/2010 | Rozkowski | |
| 7,909,899 B2 | 3/2011 | Diebold et al. | |
| 9,358,860 B2 * | 6/2016 | Park | B60H 1/3421 |
| 2006/0219064 A1 * | 10/2006 | Butz | B25B 13/48 |
| | | | 81/124.2 |
| 2007/0006528 A1 | 1/2007 | Diebold et al. | |
| 2008/0105514 A1 * | 5/2008 | Pugh | B65G 47/082 |
| | | | 198/396 |
| 2008/0111318 A1 | 5/2008 | Tomoyasu | |
| 2009/0093209 A1 * | 4/2009 | Bernal | 454/333 |
| 2009/0200767 A1 * | 8/2009 | Lim | B60G 21/0551 |
| | | | 280/124.152 |
| 2010/0006053 A1 * | 1/2010 | Kondo | F02B 31/06 |
| | | | 123/184.56 |
| 2010/0197217 A1 * | 8/2010 | Yoskowitz | 454/317 |
| 2011/0062837 A1 | 3/2011 | Kim et al. | |
| 2011/0166550 A1 * | 7/2011 | Alexander | A61B 17/00491 |
| | | | 604/518 |
| 2013/0237140 A1 * | 9/2013 | Contreras | F24F 13/0236 |
| | | | 454/239 |
| 2014/0301764 A1 * | 10/2014 | Eberlein | A45D 34/045 |
| | | | 401/122 |
| 2015/0147955 A1 * | 5/2015 | Yoskowitz | F16K 35/027 |
| | | | 454/333 |

FOREIGN PATENT DOCUMENTS

| | | | | |
|---|---|---|---|---|
| GB | 2 167 529 | | 5/1986 | |
| GB | 2167529 A | * | 5/1986 | F16K 1/2268 |
| NL | 7514731 | | 6/1976 | |

OTHER PUBLICATIONS

International Preliminary Report on Patentability dated Jun. 6, 2014 by the IPEA/US in counterpart international application No. PCT/US2012/054069.

* cited by examiner

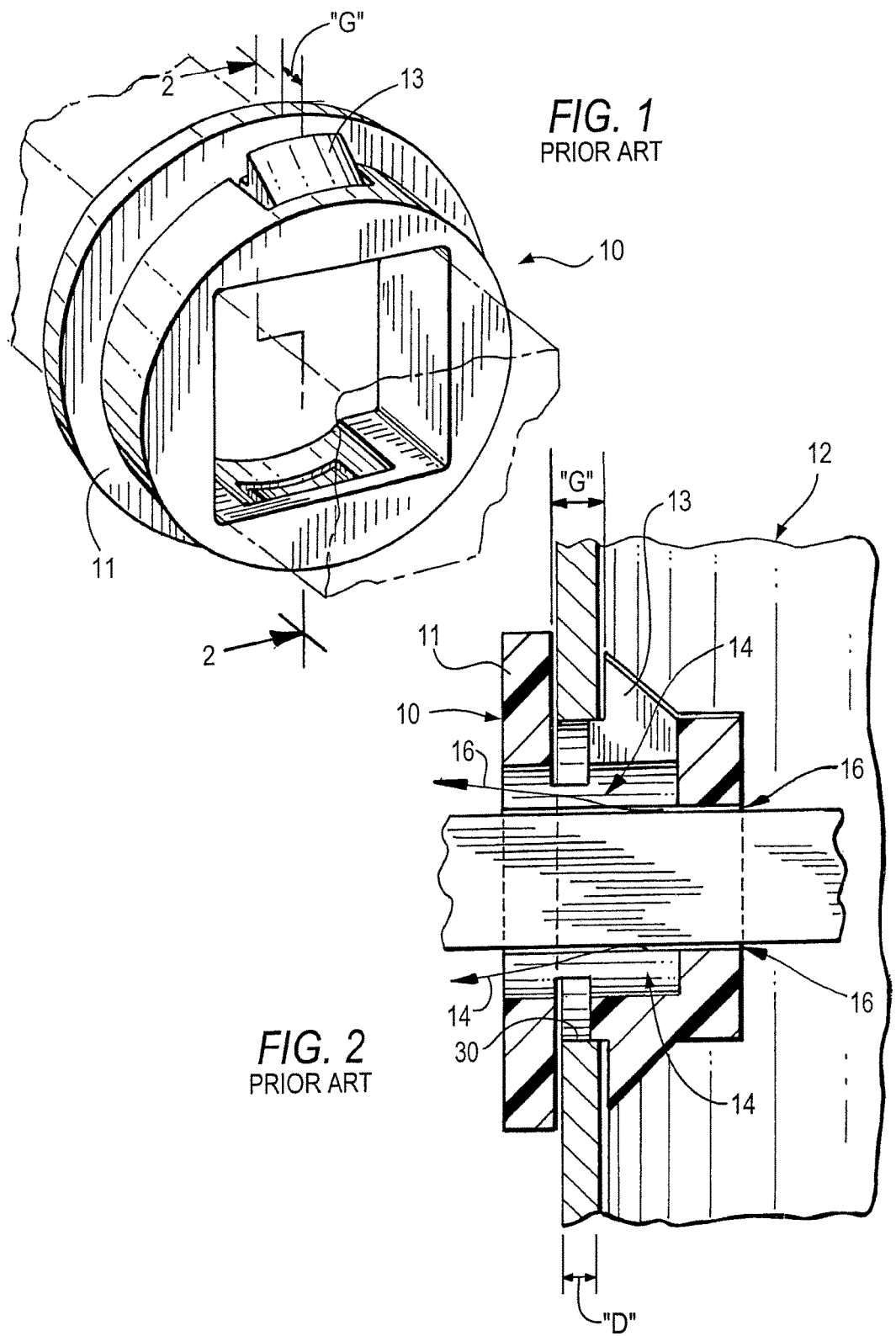

AIRTIGHT BUSHING FOR DUCTWORK DAMPER AND THE LIKE AND DUCTWORK DAMPER UNIT INCORPORATING SAME

CROSS-REFERENCE TO RELATED APPLICATIONS

This application claims priority to provisional application No. 61/573,679, filed Sep. 9, 2011, the disclosure of which is incorporated herein by reference and made a part of this application.

BACKGROUND OF THE INVENTION

1. Field of the Invention

The present invention relates to improved bushings for pivotally mounting dampers for heating and cooling ductwork systems without loss of conditioned air at the pivotal locations of the damper. The invention also relates to improved ductwork and ductwork dampers which incorporate such improved bushings. One example of such ductwork dampers is disclosed in my co-pending application Ser. No. 12/322,474, filed Feb. 2, 2009, the disclosure of which is incorporated herein by reference.

2. Description of the Related Art

Heating, ventilation and air conditioning systems, commonly referred to as "HVAC" systems, generally make extensive use of air ducts which are utilized to transport heated or cooled air (i.e., conditioned air) throughout the system. Such duct systems are generally referred to as "air ductwork," and components of such ductwork are generally made of sheet metal. While galvanized mild steel is the standard and most common material used in fabricating such ductwork, such ductwork can also be made of other materials such as aluminum, plastics, fiberglass and the like. The present invention is contemplated for use primarily with galvanized steel metal ductwork, but the use of my invention with other types of systems is also envisioned.

In most systems, the ductwork components are assembled in a manner to best distribute the air to designated locations using such featured components as plenums, take-offs, volume control dampers and the like. Take-offs may be fitted into round or rectangular openings cut into the wall of the main duct.

Volume control dampers (i.e., "VCDs") are incorporated in such HVAC ductwork systems to provide a method of adjusting the volume of air flow to various parts of the system. Such VCD's provide this function. Besides the regulation provided at the registers of diffusers that spread air into individual rooms, dampers can be fitted within the ducts themselves. These dampers may be manual or automatic. Zone dampers provide automatic control in simple systems, while VAVs (i.e., Variable Air Volume Controls) allow control in more sophisticated systems.

Dampers of the type described are generally pivotally mounted in a section of ductwork on relatively loose fitting hard plastic bushings, primarily nylon bushings. Accordingly, over time, substantial losses of energy have been sustained by leakage of conditioned air through the generous spaces which existed between the bushings and the sheet metal ductwork, and between the bushings and the damper shafts. It has been estimated that such ductwork systems utilizing the prior art bushings have sustained up to three percent (3%) loss of conditioned air.

In the past, the comparatively low cost of such energy losses did not present serious issues. However, with the rising cost of energy, the focus on such losses have become a serious cause for concern. In particular, it has been determined that such losses are not sustainable.

The present invention relates to a bushing for mounting such dampers to ductwork intended for transporting conditioned air from place to place, without the loss of such conditioned air at the pivotal locations of the dampers. As well, the invention also relates to a damper unit which incorporates such bushing, and ductwork which incorporates such damper and bushing.

SUMMARY OF THE INVENTION

A bushing is disclosed for pivotally mounting a damper to a section of ductwork for directing conditioned air in a predetermined direction, which comprises a member made of a soft pliable material, and having a generally circular outer periphery, the member defining a peripheral groove over at least a portion of the periphery for attachment of the member to a section of the ductwork by insertion into an opening in the ductwork, the opening preferably being of diameter at least equal to, or generally less than the inner diameter of the peripheral groove.

A generally central opening extends through the center of the soft pliable member for engaged reception of an elongated damper pivot rod to which the damper can be attached, for permitting the damper to be pivoted relative to the ductwork while the bushing rotates smoothly relative to the ductwork.

The bushing can be made of a natural or synthetic rubber material, although such materials are not considered to be limited. Silicone rubber or any synthetic rubber material is preferred.

The generally central opening in the bushing member is preferably tapered, with the opening of lesser dimension on one side being less than the corresponding dimension of the pivot rod, to thereby provide an airtight seal therebetween when the pivot rod is inserted into the opening. Furthermore, the generally central opening has a square cross-section, wherein on the side of lesser dimension, each side of the square opening is of dimension less than the dimension of the corresponding side of the pivot rod. The tapered opening in the bushing is such that one side is dimensioned to snugly receive the pivot rod, and the opposite side is of slightly less dimension than the pivot rod. Upon assembly, when the rod is inserted into the opening (i.e., preferably through the larger end for ease of insertion) a small outward force will be applied by the pivot rod to the body of the bushing member when it reaches the smaller end of the tapered opening in the bushing member. This force will cause the bushing material to expand radially outwardly thus increasing the already tight fit between the periphery of the bushing and the ductwork, thereby improving the seal therebetween. In a typical application, the pivot rod of the damper is square, each side being about 0.375, or about ⅜ inch, and the damper is fixed to pivotally rotate with the pivot rod. Accordingly, the tapered opening of the bushing will be square, with one end having a square opening of about 0.375 inch (i.e., about ⅜ inch), or slightly greater, along each side of the square, and the other end being square and having one side about 0.343 inch (i.e., about ¹¹⁄₃₂ inch) along each side of the square.

Preferably, the bushing for pivotally mounting a damper to a section of thin sheet metal ductwork comprises a member made of a soft pliable silicone rubber material, and defining a generally longitudinal axis, the member having a first section of generally circular configuration, preferably monolithically formed with a second section of similar generally circular configuration, the first section having an outer diameter greater than the diameter of the second section to define a radially extending generally annular surface of the first section extending circumferentially around the second section. It is foreseeable that the first section can be of shape other than circular without departing from the invention. For example, the first section can be square while still functioning to retain the bushing member in position in the ductwork.

At least two diametrically opposed lips (or "ears") extend radially outwardly from the second section and adjacent the first section, each such lip being longitudinally spaced from the annular surface of the first section. However, it should be appreciated that these lips (or "ears") are provided in the preferred embodiment, and that an embodiment which does not include such lips can function without departing from the invention. In such case the groove will perform most of the retention function, and therefore, can optionally be made deeper than in the embodiment with the lips.

A groove extends about the periphery of the second section adjacent the annular surface of the first section, the thickness of the groove in the longitudinal direction being approximately equal in dimension to the thickness of the ductwork sheet metal, and the inner diameter of the groove being equal to, or preferably slightly greater than a corresponding dimension of the aperture in the ductwork intended for insertion of the bushing member, for resilient engaged reception of the bushing member therein, whereby the bushing member may be securely attached to the ductwork by reception of the ductwork in the groove and by retention of the ductwork between the annular surface of the first section and each radially upstanding lip of the second section. As will be explained hereinbelow, the thickness of the groove in the bushing can be somewhat greater than the thickness of the ductwork sheet metal. In such case, it is preferable that the diameter of the groove provides a tight fit between the bushing member and the ductwork.

A through-opening extends generally centrally and longitudinally of the bushing member, the opening being dimensioned for slidable engaged reception of an elongated pivot rod, the rod having attached thereto, a damper member intended for directing conditioned air within the ductwork in a predetermined direction, the tapered through-opening having a cross-sectional shape similar to the cross-sectional shape of the pivot rod, such that rotation of the pivot rod produces a corresponding rotation of said member, while the member is retained in attached rotatable relation with the ductwork to provide bearing support for the pivot rod. The through-opening is preferably tapered to provide a convenient airtight fit between the pivot rod and the bushing, and as well, to facilitate ease of assembly preferably by first inserting the rod into the end of the central opening of greater dimension.

The through-opening of the member may have at least one flat surface for engagement with a correspondingly opposed flat surface on the elongated pivot rod. Further, as noted, the through-opening in the member is preferably tapered in the longitudinal direction, wherein the dimensions of the opening on one side of the member is less than the corresponding dimension of the opening on the other side of the member. The through-opening of the bushing member is usually generally square so that the bushing member rotates with the damper pivot rod when the rod is rotated.

It is envisioned that the bushing of the present invention can be of two-piece construction, each piece being dimensioned and configured to be assembled with the other piece to appear and function as a one-piece bushing.

A damper is also disclosed for pivotal attachment to a section of sheet metal ductwork, even other types of ductwork, for selectively directing conditioned air in a predetermined direction. The damper is mounted on a pair of bushings constructed according to the present invention, whereby loss of conditioned air between the pivot rod of the damper and the bushing, and between the bushing and the ductwork, is eliminated.

Improved ductwork is also disclosed for directing conditioned air in a predetermined direction, which comprises a damper rotatably mounted in the ductwork on bushings constructed according to the present invention, whereby loss of conditioned air between the pivot rod of the damper and the bushing is eliminated due to the unique bushings on which the damper is pivotally mounted.

Assembly

The sequence for assembling the damper and the bushings with the ductwork can vary. For example, the bushings can be inserted in the ductwork in one of two alternative orientations, i.e., with the larger end of the central square opening facing either the inside or the outside of the ductwork. The pivot rod can then be inserted into the bushings having the damper slidably positioned thereon. Once the rod is in position, the damper can be attached to the rod by forming an indentation, or dimple, into both the damper metal and the rod. Other sequences of assembly, and the specific method of attachment, can be envisioned by persons skilled in the art.

Silicone Rubber

As noted, the bushing of the present invention is preferably made of a soft pliable flexible and resilient material, such as natural or synthetic rubber. Silicone rubber is preferred, due particularly to its physical characteristics, as well as its capability to be formed and dimensioned within predetermined units. Silicone rubber is a rubber-like material composed of silicone—itself a polymer—containing silicon together with carbon, hydrogen, and oxygen. Silicone rubbers are elastomers comprised of either one—or two-part polymers, and may contain fillers to improve properties or reduce cost. Silicone rubber is generally non-reactive, stable, and resistant to extreme environments and temperatures from minus 55° C. (i.e., −55° C.) to plus 300° C. (i.e., +300° C.), while still maintaining its useful properties.

There are also many special grades and forms of silicone rubber, including: steam resistant, metal detectable, high tear strength, extreme high temperature, extreme low temperature, electrically conductive, chemical/oil/acid/gas resistant, low smoke emitting, and flame-retardant. A variety of fillers can be used in silicone rubber, although most are non-reinforcing and lower the tensile strength.

The silicone rubber contemplated by the present invention may be of hardness in a range of hardness levels, expressed as Shore A or IRHD, between 10 and 100, the higher number being the harder compound. It is also available in virtually any colour and can be colour matched.

BRIEF DESCRIPTION OF THE DRAWINGS

Preferred embodiments of the invention will be described hereinbelow with reference to the drawings, wherein:

FIG. 1 is an enlarged front, left side and top perspective view of a prior art bushing for ductwork dampers and the like, the bushing being made of a relatively rigid plastic material such as nylon or the like;

FIG. 2 is an enlarged cross-sectional view of the bushing of FIG. 1, taken along lines 2-2 of FIG. 1, and installed in a section of ductwork for pivotally mounting a damper within the section of ductwork, and illustrating the relatively loose fit of the bushing in the ductwork, which loose fit allows the transfer of energy by leakage of conditioned air, i.e., cooled or heated air, through several paths as shown, from the passageway of the ductwork to the outside atmosphere;

DETAILED DESCRIPTION OF THE INVENTION

Figures 3, 4:
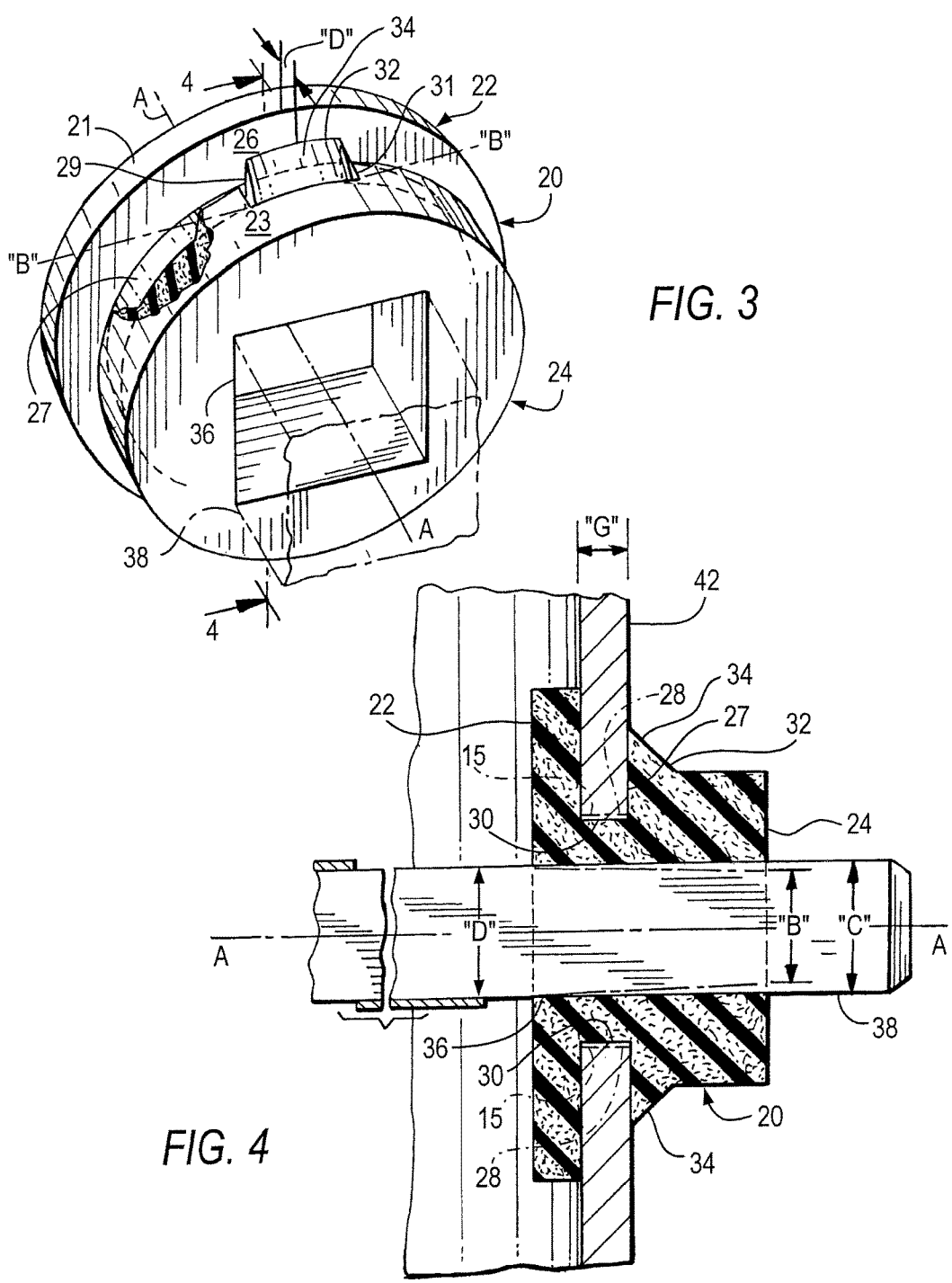
FIG. 3 is an enlarged front, left side and top perspective view of a soft and pliable bushing constructed as shown, according to the present invention.
FIG. 4 is an enlarged cross-sectional view of the bushing of FIG. 3, taken along lines 4-4 of FIG. 3, and inserted into a section of ductwork from the inside of the ductwork, and pivotally mounting a rotatable damper to the ductwork via a damper pivot rod, this FIG. illustrating the improved tight fit of the bushing with the ductwork, which tight fit prevents loss of conditioned air, and consequent loss of energy from inside the passageway of the ductwork to the outside of the ductwork, while facilitating pivotal motion for the damper along with the pivot rod and the bushing.

Referring now to the drawings, FIG. 1 is an enlarged front, left side and top perspective view of a prior art bushing 10 for pivotally mounting ductwork dampers, the bushing being made of a relatively rigid plastic material such as nylon or the like.

FIG. 2 is an enlarged cross-sectional view of the bushing 10 of FIG. 1, taken along lines 2-2 of FIG. 1, the bushing installed in a section 12 of sheet metal ductwork for pivotally mounting a damper within the section of the metal ductwork. As can be readily seen from FIG. 2, the relatively loose fit of the rigid plastic bushing in the sheet metal ductwork provides avenues of escape for the conditioned air, which may be either heated or cooled for the user's comfort. In particular, the conditioned air can escape, inter alia, along the paths illustrated by arrows 14, 16 in FIG. 2.

In general, such prior art bushings provide a relatively overall loose fit with the ductwork, providing significant avenues of escape for the conditioned air, significant enough to cause concern. As can be seen in FIG. 2, leakage of conditioned air occurs between the prior art bushing and the ductwork, and between the bushing and the damper shaft, all due to the loose fit and rigid character of the prior art bushing. For example, it can be observed from FIGS. 1 and 2, that dimension "G" between the annular flange 11 of the bushing and its retaining ear 13 is greater than dimension "D", the thickness of the ductwork 12, providing yet another avenue for escape of conditioned air, due to the overall configuration and dimensional irregularities which exist between the bushing and the ductwork, as well as the rigid character of the prior art bushing. Furthermore, the prior art bushing does not contain a groove for reception of the ductwork metal, as compared with the bushing of the present invention as will be seen in the description which follows.

Referring now to FIGS. 3 and 4, a bushing 20 constructed according to the present invention is shown. In FIG. 4, the bushing is installed in a section 42 of sheet metal ductwork. As shown in the preferred embodiment, the bushing 20 is made of a soft silicone rubber material which is not only pliable, but which also provides a significant degree of lubricity, a feature unique to silicone rubber, which feature permits the bushing to pivotally rotate with ease when such pivotal rotation of the damper is necessary. This feature is significant, particularly since the present invention requires a snug fit between the bushing and the ductwork, and between the bushing and the pivot rod 38, while permitting pivotal rotation of the damper when required to alter the direction of conditioned air in a branch of the network. In one respect the bushing functions somewhat like a bearing when pivotally rotated.

In FIGS. 3 and 4, the bushing 20 of the present invention includes a circular shaped member 20 made of silicone rubber material, the member 20 having a first section 22 of a first diameter, and a second section 24 of lesser diameter, preferably monolithically molded with the first section 22. As can be seen, first section 22 has an outer circumferential and peripheral surface 21 of diameter which is greater than the outer circumferential and peripheral surface 23 of the second section 24 to form annular surface 26 extending radially outward from the second section 24.

A peripheral groove 27 extends about the entire periphery of the second section 24 between first section 22 and the second section 24 as shown. This groove 27 receives and interfaces with the sheet metal ductwork 42 as shown in FIG. 4, to provide an airtight seal between the bushing 20 and the ductwork 42. As can be seen further, the bushing 20 is retained in the ductwork 42 in a circular aperture 30, the diameter of which is preferably slightly less than the inner diameter 15 of peripheral groove 27. The thickness of such sheet metal ductwork is generally about 0.012 and 0.095 inch. Depending upon the application, other thicknesses greater or lesser, can be used.

In the FIGS., the inner diameter 15 of peripheral groove 27 appears to match the diameter of aperture 30 in ductwork 42, a condition which is acceptable. However, in the preferred embodiment, the diameter of aperture 30 formed in the ductwork 42, is preferably slightly less than the initial inner diameter 28 of the peripheral groove 27 (indicated by dash line 28 in FIG. 4) to provide a predetermined amount of compression of the bushing material, which in turn provides even an improved airtight seal. In FIG. 4, phantom lines 28 show the original uncompressed inner surface of groove 27, prior to insertion of the bushing into aperture 30. For example, should the diameter of aperture 30 in ductwork 42 be about 0.610 inch, then the uncompressed inner diameter 15 of peripheral groove 27 in bushing 20 can be approximately 0.625 (i.e., 5/8) inch. Thus the diameter of aperture 30 in the ductwork is about 2% to 3% less than the uncompressed diameter of peripheral groove 27 in bushing 20. Such relative dimensions can be altered, depending upon the seal desired. If desired, both diameters can be made equal.

Referring again to FIGS. 3 and 4, bushing 20 also includes diametrically opposed radially extending lips (or "ears") 32, 34 which conveniently assist groove 27 in permanently retaining the bushing 20 in the aperture 30. Lips 32, 34 are attached to, or otherwise extend radially outwardly from the second section 24 for resilient pivot-like movement about axis B-B (shown in FIG. 3) axis which is perpendicular to the longitudinal axis A-A of the bushing 20. Such resilient pivotal movement of lips 32, 34 is provided by longitudinal cuts 29, 31 (best shown in FIGS. 3 and 10), and facilitates one-way insertion into aperture 30 of ductwork 42 to permit entry thereof through the aperture until the ductwork 42 enters groove 27, and corresponding resilient return of lips 32, 34 to the engaging positions shown in FIG. 4. Lips 32, 34 are spaced from annular surface 26 by distance "G", which is approximately equal to the thickness of the sheet metal ductwork and the groove 27. As noted, the invention can be practiced without the lips (or "ears") 32, 34. In such case the groove may be made deeper to retain the bushing in place within the ductwork between the groove and the annular radial surface. In any event, the lips (or "ears") 32, 34 are preferred.

Figure 9:
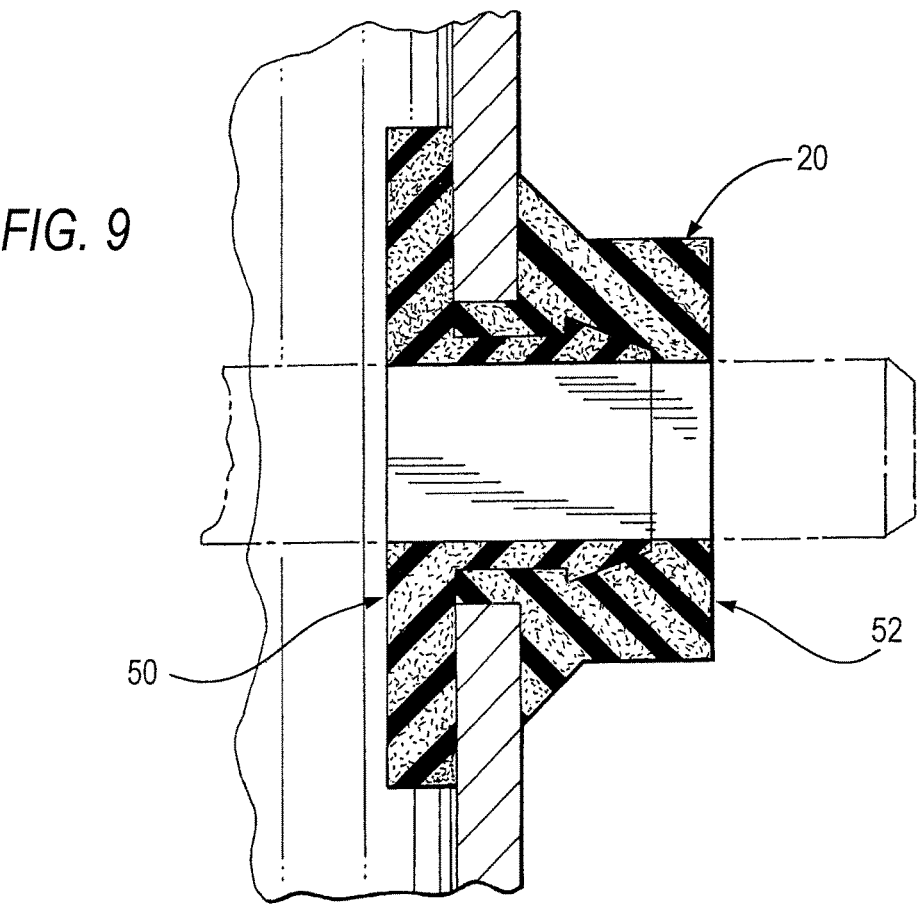
FIG. 9 is a cross-sectional view of an alternative embodiment of the present invention, wherein the bushing member is of two-piece construction, each piece providing relative ease of assembly with the other, and with the ductwork, all other features being the same as in the previously described embodiments.

In FIGS. 3 and 4, bushing 20 also defines a central longitudinal axis A-A which extends through central square aperture 36, through which correspondingly shaped and dimensioned pivot rod 38 extends. As seen in FIG. 9, pivot rod 38 is attached to damper 40 which is mounted to ductwork section 42 for pivotal movement to direct conditioned air through the ductwork in a predetermined direction. Although two spaced apart lips 32, 34 are shown separate and apart from each other, a person of ordinary skill in the art will appreciate that a continuous lip can circumscribe the groove 27. Still, alternatively a greater plurality of such lips can be positioned about the circumference of the second section 24, spaced from each other by a predetermined number of degrees.

Figure 11:
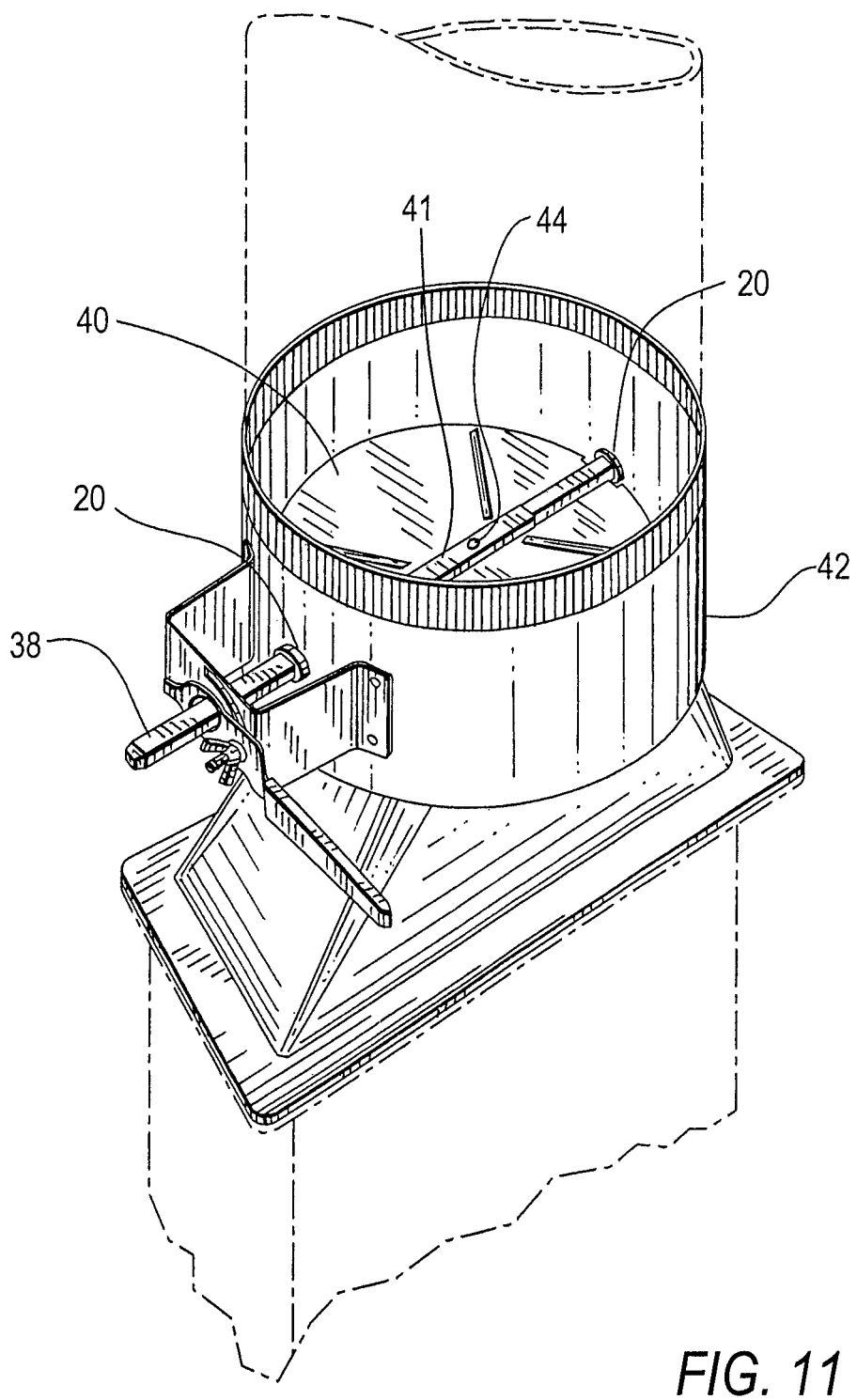
FIG. 11 is a front, right side and top perspective view, of a section of ductwork showing a typical installation of a damper mounted on bushings constructed according to the present invention.

As shown in FIGS. 4 AND 11, the pivot rod 38 of square cross section is in turn, mounted on bushings 20 constructed according to the present invention.

Referring again to FIGS. 3 and 4, the central aperture 36 of bushing 20 is conveniently tapered, with dimension "C" of pivot rod 38 being greater than the initial (i.e., pre-insertion) dimension "B" of opening 36 of bushing 20. Dimension "B" is preferably less than the corresponding dimension "C" of the pivot rod 38 to ensure a tight seal between the bushing 20 and the pivot rod 38. For a pivot rod 38 of square cross-section the dimensionally tight fit is along all sides of pivot rod 38. For pivot rods of other cross-sections, i.e., circular or the like, the tight fit between the bushing 20 and the pivot rod 38 extends entirely about the pivot rod.

In FIG. 4, the initial configuration of square opening 36 is shown as being tapered, i.e., from initial greater dimension "D" of the inner side of the bushing 20 to smaller dimension "B" on the outer side of bushing 20. After insertion of damper pivot rod 38, the opening 36 substantially conforms to the outer surface and dimensions of the pivot rod 38 as shown in the FIG.

As noted, the initial taper of square opening 36 facilitates convenience of assembly with the damper pivot rod 38, while assuring a tight fit between the pivot rod 38 and at least the opening of dimension "B". For example, the pivot rod 38 can be inserted into the inner side of opening 36 of greater dimension "D", ultimately to reach the outer side opening of dimension "B" of lesser dimension, to form a tight seal with the pivot rod 38. In addition, the dimension "G", i.e., the width of the ductwork sheet metal, can be equal to the width of the groove 27 sufficient to fit snugly in the groove. The airtight seal is provided primarily by the compressive engagement between the sheet metal of ductwork 42 and the inner diameter of groove 27, since the diameter of the aperture 30 is less than the uncompressed inner diameter of groove 27, as shown by phantom lines 28 in the drawings, which show the groove 27 prior to insertion of the bushing 20 in the aperture 30. This arrangement ensures a tight fit between the ductwork and the bushing 20. Additionally, as noted, when the pivot rod 38 of square cross section is inserted into the inner end of opening 36 of greater dimension "D", as it reaches the smaller end of the taper of initial dimension "B", it applies outward force against bushing 20 which increases the tight fit between the sheet metal and groove 27.

It can be readily appreciated that the snug fit between bushing 20 and ductwork section 42, and between bushing 20 and pivot rod 38, both ensure a significantly improved airtight seal therebetween, while permitting pivotal rotation of the pivot rod 38, as facilitated by the relatively low friction surface of the silicone rubber and the bearing support provided by the bushing member 20.

It should also be appreciated that while silicone rubber is the preferred material for fabricating the bushing, any soft and pliable material may be used, such as synthetic or natural rubber, or other known elastomers.

Figure 5:
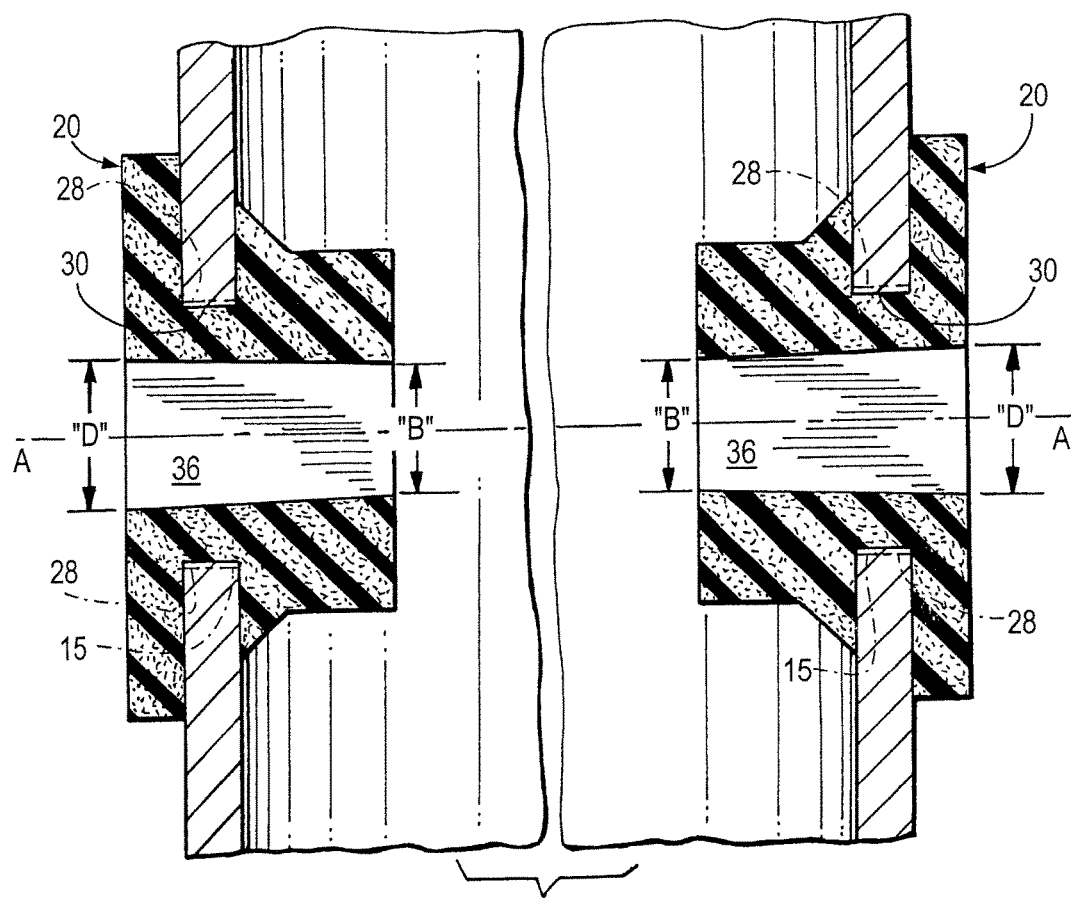
FIG. 5 is a cross-sectional view, similar to FIG. 4, of the bushing of the present invention, mounted on each side of a section of ductwork, the bushing being inserted on both sides of the ductwork from the outside of the ductwork, this FIG. illustrating one possible arrangement available with the present bushing, with the smaller end of the tapered inner opening for the damper shaft facing inwardly of the ductwork.

Referring now to FIG. 5, alternative constructions and configurations of the bushing of the present invention are disclosed, whereby the taper of the square opening 36 of the bushing can be oriented in either of two directions. Such alternative configurations make convenient, the assembly of the damper pivot rod 38 with the bushings 20, as well as the assembly of the bushings with the section of ductwork. For example, the damper pivot rod 38 may be first assembled with the damper blade and the bushings by first inserting the rod 38 into the large end "D" of opening 36 of bushing 20, or alternatively, by first inserting the rod 38 into the smaller end "B" of bushing 20. The assembly procedure will be dependent upon the preferred sequence of assembly of the pivot rod 38 with the damper 40 and then the assembly of the damper assembly with the section of ductwork. In either sequence, the smaller size of dimension "B" will always assure an airtight fit with the rod 38. At one point in the assembly sequence, the damper plate 40 shown in FIG. 11 can be attached to pivot rod 38 by forming an indentation, or dimple, 44 to create the attachment.

Figure 6:
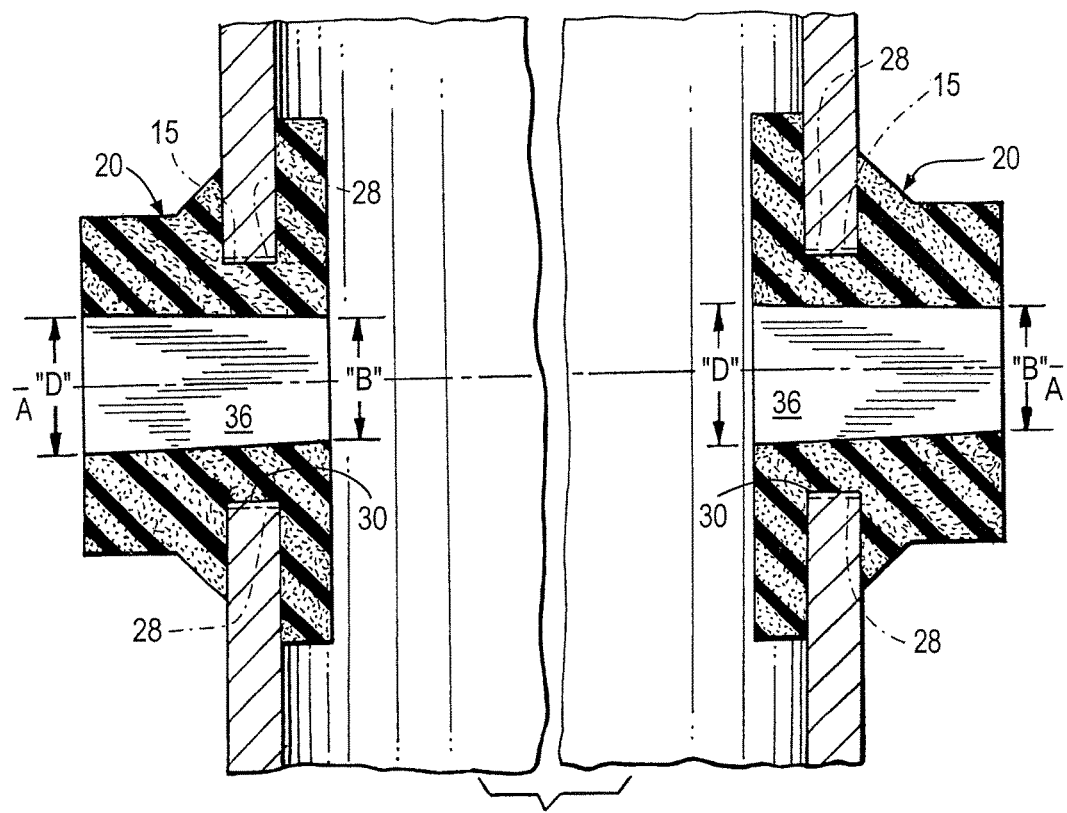
FIG. 6 is a cross-sectional view which illustrates alternative configurations and mounting positions and orientations available with the present inventive bushing, the view on the left side of FIG. 6 showing the square opening for the damper pivot rod tapering toward the inner passageway of the ductwork, and the view on the right side of FIG. 6 illustrating the square opening for the damper pivot rod tapering toward the outside of the ductwork in each instance, the respective bushing having been inserted into the opening from the inside of the ductwork.

FIG. 6 illustrates yet another alternative embodiment, wherein the bushings 20 are shown with the central aperture 36 respectively oriented in opposite directions with respect to the ductwork. These orientations will in turn accommodate any of several alternative sequences of steps to assemble the components together. It should be noted that generally, the damper plate 40 is attached to pivot rod 38 by an indentation 44 in the center of the rod, which retains the assembly.

Referring now to FIG. 11, the damper plate 40 and bushings 20 are shown in assembled relation with the ductwork 42. As noted, the damper plate 40 is attached to pivot rod 38 by an indentation 44 formed in the damper sleeve 41 in which the rod 38 is inserted. This indentation 44 serves to retain the damper 40 and pivot rod 38 in assembled relation such that pivotal rotation of the pivot rod 38 will cause corresponding rotation of the bushings 20 and the damper plate 40. Accordingly, the pivot rod 38 can first be assembled to the bushings 20, and later to the damper 40; or alternatively, the damper 40 can first be assembled with pivot rod 38, and later assembled to the section of ductwork 42 utilizing bushings 20. The various orientations of the central square aperture 36 in bushing 20 make these alternative methods of assembly possible.

In general, although the preferred method of assembly is to first insert the pivot rod 38 into the larger end of the tapered aperture 36 of bushing 20. Because of the flexible resilience of the silicone rubber material of bushing 20 if necessary, using slightly greater force, the pivot rod can first be inserted into the smaller end of the tapered aperture 36 of bushing 20, since the airtight seal therebetween will still be maintained.

It should be noted that the central aperture 36 of bushing 20 shown in the FIGS. is square in shape. The use of the square pivot rod is fairly common in the industry, as it can be easily be made to rotate the damper, and it can readily be attached to the damper by forming an indentation, or dimple 44, in the center of the damper. However, a pivot rod of any shape which facilitates simultaneous rotation of the damper with the pivot rod 38 is contemplated for use with the invention. For example, the pivot rod and the central aperture 36 of bushing 20 can be triangular in cross-section, or even circular, provided that the appropriate structure and dimensions to secure the components together are accommodative for simultaneous pivotal rotation.

Figures 7, 8:
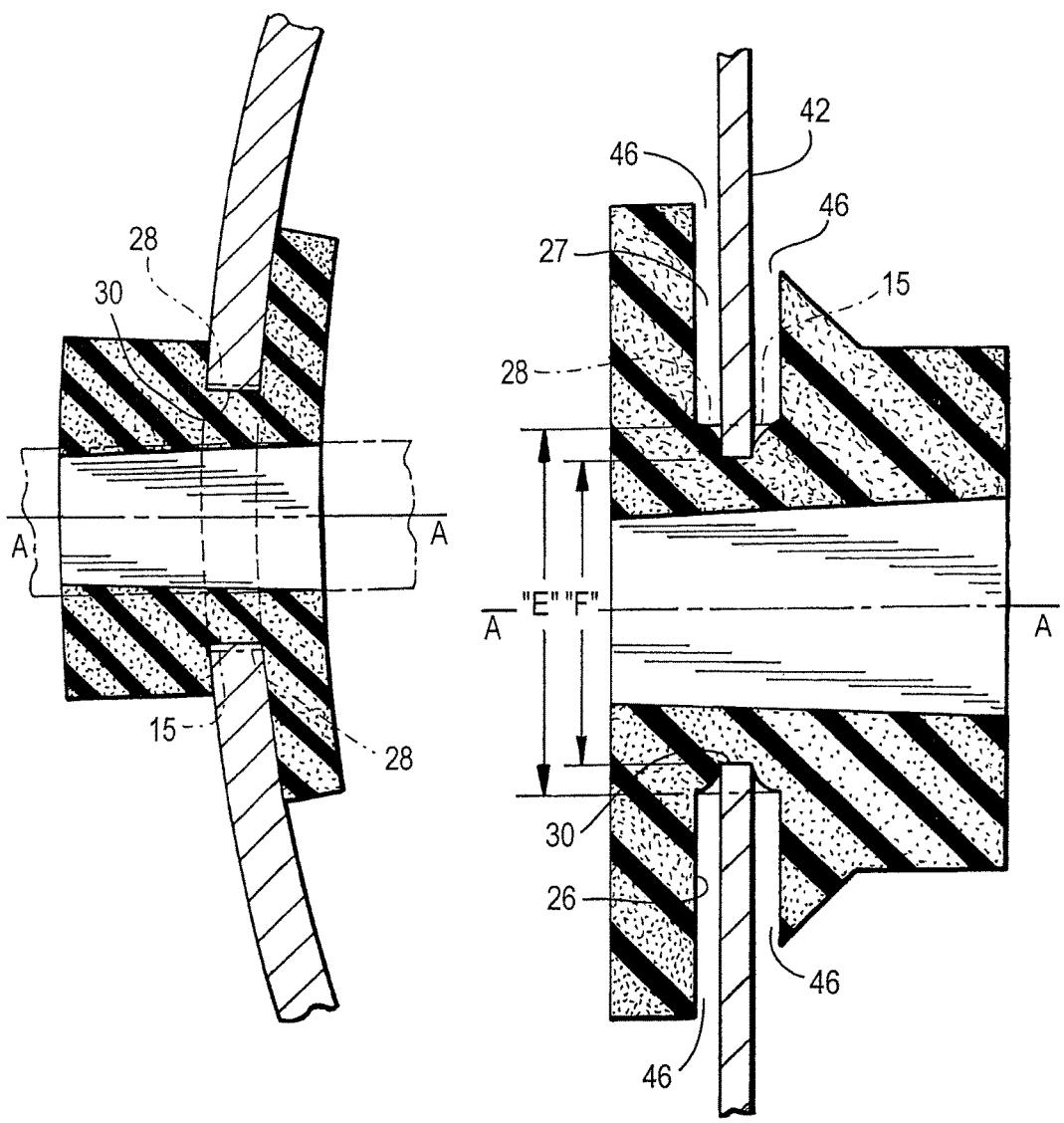
FIG. 7 is a cross-sectional view of the bushing of the present invention, mounted on an arcuate section of ductwork, and illustrating how the soft pliable material of such bushing combines with the configuration to conform the bushing to the curvature of the ductwork to enhance the seal provided between the bushing and the ductwork, without adversely affecting the pivotal movement of the damper relative to the ductwork.
FIG. 8 is an enlarged cross-sectional view of the bushing of the present invention mounted to a section of ductwork made of a ductwork material of thinner gauge than in the previous views, the soft and pliable property of the bushing facilitating a tight fit without compromising the airtight arrangement between the bushing and the thinner gauge ductwork.

FIG. 7 illustrates an advantage of the bushing of the present invention which accommodates the curvature of the section of ductwork to ensure an airtight seal, due to the pliable and resilient nature of the bushing.

FIG. 8 illustrates yet another advantage of the present bushing which makes it possible to achieve an airtight seal, even with ductwork made of sheet materials which are thinner than the sheet materials in common use. In such instance, although spaces 46 may be present, leakage of conditioned air will be prevented by the engagement between the ductwork 42 and the groove 27 as shown, which promotes an airtight seal. This seal is facilitated by initial inner diameter "E" of groove 27 being greater than the final compressed diameter "F" of aperture 30 of ductwork 42.

Figure 10:
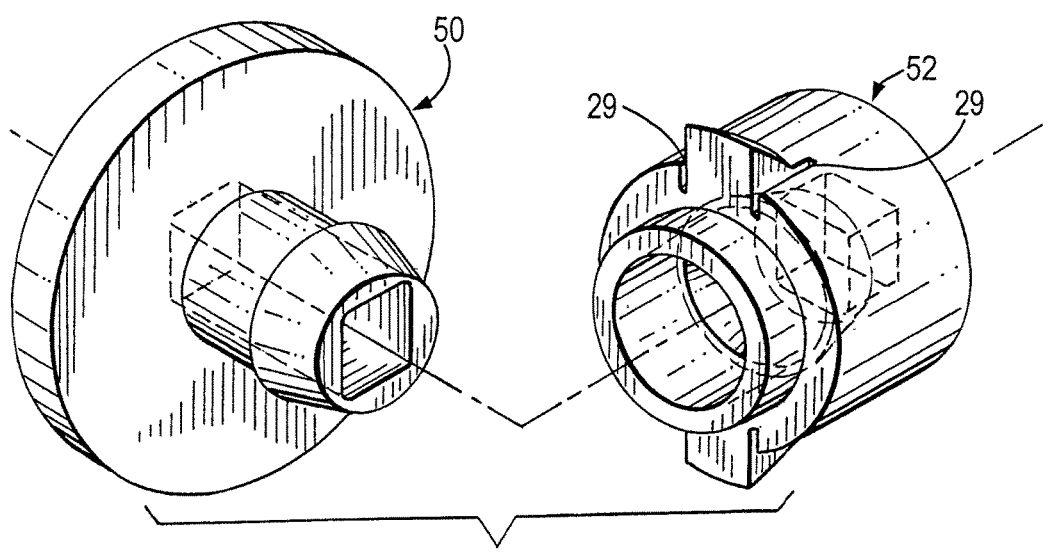
FIG. 10 is a top perspective view of the two-piece bushing member of FIG. 9, with parts separated for illustration purposes.

In each of the embodiments described, it is contemplated that the bushings 20 can be made in several sections, i.e., two or more pieces, which can be assembled to function as a single bushing as described herein. FIGS. 9 and 10 illustrate such bushing 20, which can be made in two pieces, for example, male piece 50 and female piece 52 each of which can be respectively dimensioned for assembly in interference relation as shown in FIG. 9. The resilience of the silicone (or other) rubber material of each piece shown in FIG. 10 facilitates ready snapped interference alignment and assembly of the two half sections 50 and 52 as shown in FIG. 9.

As noted previously, FIG. 11 illustrates a section of ductwork having a damper assembly mounted for pivotal rotation thereon, incorporating the bushing of the present invention.

While the present invention is contemplated for use with conventional ductwork made of thin galvanized sheet metal, of thickness between 0.012 and 0.60 inches, and having a generally tubular configuration of circular cross-section, it may be used with alternative ductwork materials such as plastics, fiberglass, flexible ducting or the like. In addition, the ductwork can be of alternative designs, such as ductwork having a rectangular or square cross-section. In such installations the structure which incorporates the damper would necessarily be structured and arranged to facilitate installation of the damper of the present invention and the damper configuration will be arranged to match the ductwork.

LIST OF REFERENCE NUMERALS 11 annular flange
12 section of sheet metal
13 retaining ear
14, 16 arrows
15 inner diameter
20 bushing
21 outer peripheral surface
22 first section
23 outer peripheral surface
24 second section
26 annular radial surface
27 peripheral groove
28 phantom lines denoting initial inner diameter of peripheral groove 27
29, 31 cuts adjacent lips (or ears) 32, 34
30 circular aperture
32, 34 diametrically opposed radially extending lips (or ears)
36 central square opening of inventive bushing 20
38 damper pivot rod
40 damper plate
41 damper sleeve
42 sheet metal ductwork section
44 indentation dimple
46 spaces between thin sheet metal ductwork and peripheral groove 27
50 male piece of two piece embodiment
52 female piece of two piece embodiment

The invention claimed is:

1. A bushing for pivotally mounting a damper to a section of a ductwork for directing conditioned air through the ductwork in a predetermined direction:

a) said bushing being made of a soft, pliable and resilient material, and having a generally circular outer periphery, wherein said soft, pliable and resilient material is a natural or synthetic rubber material, said bushing defining a generally central longitudinal rotational axis A-A and a generally circular groove extending over at least a portion of said periphery for attachment of said bushing to the section of ductwork by insertion of said bushing into a circular opening in the section of ductwork, and reception in said generally circular groove of said periphery of a portion of the section of ductwork defining said circular opening, and to provide direct airtight contact between the ductwork portion defining said circular opening and an inner diameter of said peripheral groove;

b) said bushing comprising a generally central through-opening tapered along the generally central longitudinal rotational axis and extending axially along the generally central longitudinal rotational axis A-A through a center of said bushing for engaged contacting reception of an end portion of an elongated damper pivot rod being separate and distinct from said bushing and adapted to extend axially along the generally central longitudinal rotational axis A-A to which said damper is attached, for permitting said bushing, said damper pivot rod, and said damper to be simultaneously pivoted about the generally central longitudinal rotational axis A-A within the section of ductwork, said generally central tapered through-opening having a first end and a second end positioned at opposite ends of the generally central longitudinal rotational axis A-A, wherein a cross-sectional dimension of the first end is greater than a cross-sectional dimension of the second end to provide an airtight seal with the elongated damper pivot rod; and c) said bushing comprising a pair of diametrically opposed retaining lips adjacent said groove and extending radially outwardly of said groove, said lips being positioned, dimensioned and configured to face respective portions of said section of ductwork adjacent said circular opening to assist in retaining said bushing in said circular opening.

2. The bushing according to claim 1, wherein said synthetic rubber material is silicone rubber, which provides lubricity to facilitate ease of pivoting of said damper without loss of conditioned air past all contact surfaces between said bushing and the ductwork and said bushing and the pivot rod.

3. The bushing according to claim 2, wherein said generally central tapered through-opening in said bushing has a rectangular cross-section, each side of said generally central tapered through-opening at said first end initially being of a dimension greater than a dimension of a corresponding side of the pivot rod, and each side of said generally central tapered through-opening at said second end initially being less than a dimension of a corresponding side of the pivot rod.

4. The bushing according to claim 1, wherein said bushing is comprised of two pieces configured and dimensioned to be assembled together to appear and function as a unitary bushing.

5. A bushing for pivotally mounting a damper to a section of thin sheet metal ductwork:

a) said bushing being made of a soft, pliable and resilient silicone rubber material, and defining a generally central longitudinal rotational axis A-A, said bushing having a first section of generally circular configuration monolithically formed with a second section of similar generally circular configuration, said first section having a diameter greater than a diameter of said second section to define an annular surface extending radially outwardly of said first section;

b) said bushing comprising a groove which extends about a periphery of said second section adjacent said annular surface of said first section, a thickness of said groove in a longitudinal direction of the bushing being approximately equal in dimension to a thickness of the section of thin sheet metal ductwork, and an inner diameter of said groove being at least equal to, or greater than a corresponding dimension of an aperture in the section of thin sheet metal ductwork provided for resilient engaged air-tight reception of said bushing therein, whereby said bushing may be securely attached to the ductwork by insertion of said bushing into the aperture and reception in said groove of a portion of the section of thin sheet metal ductwork defining said aperture, whereby the portion of the section of thin sheet metal ductwork is retained between said annular surface of said first section and said groove;

c) said bushing comprising at least two diametrically opposed lips extending radially outwardly from said second section adjacent said groove, each said lip being dimensioned and configured to face said annular surface of said first section; and d) said bushing comprising a tapered through-opening extending generally centrally and longitudinally along the generally central longitudinal rotational axis A-A of said bushing, said tapered through-opening being dimensioned for slidable engaged contacting reception of an elongated pivot rod being separate and distinct from said bushing and adapted to extend axially along the generally central longitudinal rotational axis A-A, the pivot rod having attached thereto, a damper member for directing conditioned air within the section of the thin sheet metal ductwork in a selected predetermined direction, said tapered through-opening having a first end and a second end positioned at opposite ends of the generally central longitudinal rotational axis A-A, wherein a cross-sectional dimension of the first end is greater than a cross-sectional dimension of the second end to provide an airtight seal with the elongated damper pivot rod, such that rotation of the pivot rod about the generally central longitudinal rotational axis A-A produces a corresponding rotation of said bushing, while said bushing is retained in attached rotatable relation with the section of the thin sheet metal ductwork to provide bearing support for the pivot rod.

6. The bushing according to claim 5, wherein said through-opening of said bushing has at least one flat surface for engagement with a correspondingly opposed flat surface on said elongated pivot rod.

7. The bushing according to claim 6, wherein said through-opening of said bushing has a generally square cross-section for reception of a similarly configured and dimensioned pivot rod.

8. A bushing for pivotally mounting a damper plate to a section of thin sheet metal ductwork, for directing conditioned air through the section of the thin sheet metal ductwork in a predetermined direction, which comprises:

a) said a bushing being made of a soft, pliable and resilient silicone rubber material, and defining a generally longitudinal rotational axis A-A, said bushing having a first section of circular configuration monolithically formed with a second section of circular configuration, said first section having an outer periphery dimensioned greater than a diameter of said second section, to define an annular surface of said first section extending radially outwardly from said first section;
b) said bushing comprising a groove which extends about a periphery of said second section adjacent said annular surface of said first section, a thickness of said groove in a longitudinal direction of the bushing being approximately equal in dimension to a thickness of the section of thin sheet metal ductwork, and an inner diameter of said groove being at least equal to, or greater than a corresponding diameter of an aperture in the section of thin sheet metal ductwork, said bushing being configured for resilient engaged reception in the aperture and reception of a portion of the section of thin sheet metal ductwork defining said aperture into said groove, whereby the portion of the section of thin sheet metal ductwork is retained between said annular surface of said first section and said groove, thereby providing an airtight seal therebetween;
c) said bushing comprising a pair of diametrically opposed retaining lips adjacent said groove and extending radially outwardly therefrom, said lips being dimensioned and configured to face respective portions of said section of thin sheet metal ductwork adjacent said aperture to assist in retaining said bushing in said aperture; and
d) said bushing comprising a tapered through-opening extending generally centrally and longitudinally along the generally central longitudinal rotational axis A-A of said bushing, said tapered through-opening being dimensioned for slidable engaged contacting reception of an elongated pivot rod being separate and distinct from said bushing and adapted to extend axially along the generally central longitudinal rotational axis A-A, the rod having attached thereto, a damper plate for directing conditioned air within the ductwork in a selected predetermined direction, said tapered through-opening having a first end and a second end positioned at opposite ends of the generally central longitudinal rotational axis A-A, wherein a cross-sectional dimension of the first end is greater than a cross-sectional dimension of the second end to provide an airtight seal with the elongated damper pivot rod, such that rotation of the pivot rod about the generally central longitudinal rotational axis A-A produces a corresponding rotation of said bushing, while said bushing and the damper plate is retained in attached rotatable relation with the section of thin sheet metal ductwork to provide bearing support for the pivot rod.

9. A bushing for pivotally mounting a damper plate to a section of thin sheet metal ductwork:
a) said bushing being made of a soft, pliable and resilient silicone rubber material, and defining a generally longitudinal axis A-A, said bushing having a first section monolithically formed with a second section of circular configuration, said first section having an outer peripheral dimension greater than the diameter of said second section to define an annular surface of said first section extending outwardly from and surrounding said second section;
b) said bushing comprising a groove which extends about a periphery of said second section adjacent said annular surface of said first section, a thickness of said groove in a longitudinal direction of the bushing being approximately equal or greater in dimension to a thickness of the section of thin sheet metal ductwork, and an inner diameter of said groove being at least equal to, or slightly greater than a corresponding diameter of an aperture in the section of thin sheet metal ductwork for resilient engaged reception of said bushing therein, whereby said bushing may be securely attached to the section of thin sheet metal ductwork by insertion of said bushing into the aperture and reception in said groove of a portion of the section of thin sheet metal ductwork defining the aperture, whereby the section of thin sheet metal ductwork is retained between said annular surface of said first section and said groove, thereby providing an airtight seal therebetween; and
c) said bushing comprising a tapered through-opening extending generally centrally and longitudinally along the generally central longitudinal rotational axis A-A of said bushing, said tapered through-opening being dimensioned for slidable engaged contacting reception of an elongated pivot rod being separate and distinct from said bushing and adapted to extend axially along the generally central longitudinal rotational axis A-A, the rod having attached thereto, a damper member configured and dimensioned for directing conditioned air within the section of thin sheet metal ductwork in a selected predetermined direction, said tapered through-opening having a first end and a second end positioned at opposite ends of the generally central longitudinal rotational axis A-A, wherein a cross-sectional dimension of the first end is greater than a cross-sectional dimension of the second end to provide an airtight seal with the elongated damper pivot rod, such that rotation of the pivot rod about the generally central longitudinal rotational axis A-A produces a corresponding rotation of said bushing, while said bushing is retained in attached rotatable relation with the section of thin sheet metal ductwork to provide bearing support for the pivot rod.

10. A damper unit for attachment to a ductwork system for selectively directing conditioned air in a predetermined direction, which comprises:
a) a section of ductwork having a generally tubular shape and defining a generally longitudinal axis;
b) an elongated pivot rod having a generally square cross-section and being rotatably attached to said section of ductwork in a direction generally perpendicular to said longitudinal axis;
c) a plate member attached to said pivot rod for simultaneous pivotal rotation therewith, said plate member being configured and dimensioned to prevent conditioned air from passing through said section of ductwork when in a closed position, and being pivotally rotatable to an open position which permits conditioned air to pass through said section of ductwork, wherein said plate member has a shape selected from the group consisting of generally circular, generally rectangular, and generally square;
d) a pair of bushings pivotally mounting said pivot rod to said section of ductwork, a first bushing positioned at one end of said pivot rod, and a second bushing positioned at the other end of said pivot rod, each said bushing including:
   i) a bushing made of a soft, pliable and resilient silicone rubber material, and defining a generally longitudinal axis A-A, said bushing having a first section monolithically formed with a second section of circular configuration, said first section having an outer peripheral dimension greater than the diameter of said second section to define an annular surface of said first section extending outwardly from and surrounding said second section;

ii) a groove which extends about a periphery of said second section adjacent said annular surface of said first section, a thickness of said groove in a longitudinal direction of the bushing being approximately equal or greater in dimension to a thickness of the section of thin sheet metal ductwork, and an inner diameter of said groove being at least equal to, or slightly greater than a corresponding diameter of an aperture in the section of thin sheet metal ductwork for resilient engaged reception of said bushing therein, whereby said bushing may be securely attached to the section of thin sheet metal ductwork by insertion of said bushing into the aperture and reception in said groove of a portion of the section of thin sheet metal ductwork defining the aperture, whereby the section of thin sheet metal ductwork is retained between said annular surface of said first section and said groove, thereby providing an airtight seal therebetween; and iii) a tapered through-opening extending generally centrally and longitudinally along the generally central longitudinal rotational axis A-A of said bushing, said tapered through-opening being dimensioned for slidable engaged contacting reception of an elongated pivot rod being separate and distinct from said bushing and adapted to extend axially along the generally central longitudinal rotational axis A-A, the rod having attached thereto, a damper member configured and dimensioned for directing conditioned air within the section of thin sheet metal ductwork in a selected predetermined direction, said tapered through-opening having a first end and a second end positioned at opposite ends of the generally central longitudinal rotational axis A-A, wherein a cross-sectional dimension of the first end is greater than a cross-sectional dimension of the second end to provide an airtight seal with the elongated damper pivot rod, such that rotation of the pivot rod about the generally central longitudinal rotational axis A-A produces a corresponding rotation of said bushing, while said bushing is retained in attached rotatable relation with the section of thin sheet metal ductwork to provide bearing support for the pivot rod.

11. The damper unit according to claim 10, wherein each said bushing includes a pair of diametrically opposed restraining lips adjacent said groove and extending radially outwardly of said groove, said lips being dimensioned and configured to face respective portions of said section of ductwork adjacent said circular opening in said section of ductwork to assist in retaining said bushing in said circular opening.

12. The device according to claim 3, wherein said generally central tapered through-opening in said bushing is square.

* * * * *